United States Patent
Nemes

(10) Patent No.: US 9,690,699 B1
(45) Date of Patent: Jun. 27, 2017

(54) METHODS AND APPARATUS FOR INFORMATION STORAGE AND RETRIEVAL USING A CACHING TECHNIQUE WITH EXTERNAL-CHAIN HASHING AND DYNAMIC RESOURCE-DEPENDENT DATA SHEDDING

(71) Applicant: Richard Michael Nemes, Woodmere, NY (US)

(72) Inventor: Richard Michael Nemes, Woodmere, NY (US)

(*) Notice: Subject to any disclaimer, the term of this patent is extended or adjusted under 35 U.S.C. 154(b) by 70 days.

(21) Appl. No.: 14/733,648

(22) Filed: Jun. 8, 2015

Related U.S. Application Data

(63) Continuation of application No. 13/906,191, filed on May 30, 2013, now Pat. No. 9,081,672.

(51) Int. Cl.
  *G06F 17/30* (2006.01)
  *G06F 12/02* (2006.01)

(52) U.S. Cl.
  CPC .... *G06F 12/0253* (2013.01); *G06F 17/30958* (2013.01); *G06F 2212/1044* (2013.01)

(58) Field of Classification Search
  CPC combination set(s) only.
  See application file for complete search history.

(56) References Cited

U.S. PATENT DOCUMENTS

| | | |
|---|---|---|
| 4,530,054 A | 7/1985 | Hamstra et al. |
| 4,695,949 A | 9/1987 | Thatte et al. |
| 4,989,132 A | 1/1991 | Mellender et al. |
| 4,996,663 A | 2/1991 | Nemes |
| 5,043,885 A | 8/1991 | Robinson |
| 5,121,495 A | 6/1992 | Nemes |
| 5,202,981 A | 4/1993 | Shackelford |
| 5,287,499 A | 2/1994 | Nemes |
| 5,577,237 A | 11/1996 | Lin |

(Continued)

OTHER PUBLICATIONS

Ross Biro, Fred N. Van Kempen, Alan Cox, Linus Torvalds, and Alexey Kuznetsov, route.c, Linux version 2.6.31.13, /net/ipv4/, lines 116-3131.

(Continued)

*Primary Examiner* — Etienne Leroux

(57) ABSTRACT

A method and apparatus for performing storage and retrieval in an information storage system cache is disclosed that uses the hashing technique with the external chaining method for collision resolution. In order to prevent performance deterioration due to an unrestrained growth in the length of chains, an on-the-fly record removal technique is combined with background chain-pruning processes that continually trim long chains to keep chain lengths at an acceptable equilibrium without triggering abrupt, disruptive action at the time the system senses that it is stressed. More specifically, each insertion, retrieval, or deletion of a record is an occasion to rid an entire linked list of its records that have aged out. Additionally, concurrent background processes continually navigate the hash table, trimming those chains that are deemed excessively long. The aggressiveness of chain-pruning varies dynamically as the local and global state of the system fluctuates, pruning more when chains are long and the system is heavily loaded, and pruning less when chains are short and the system load is light.

20 Claims, 10 Drawing Sheets

(56) References Cited

U.S. PATENT DOCUMENTS

| | | | |
|---|---|---|---|
| 5,701,432 A | 12/1997 | Wong et al. | |
| 5,724,538 A | 3/1998 | Morris et al. | |
| 5,765,174 A | 6/1998 | Bishop | |
| 5,778,430 A | 7/1998 | Ish et al. | |
| 5,881,241 A | 3/1999 | Corbin | |
| 5,893,120 A * | 4/1999 | Nemes | G06F 17/30949 |
| 5,918,249 A | 6/1999 | Cox et al. | |
| 5,991,775 A | 11/1999 | Beardsley et al. | |
| 6,119,214 A | 9/2000 | Dirks | |
| 6,243,667 B1 | 6/2001 | Kerr et al. | |
| 6,424,992 B2 | 7/2002 | Devarakonda et al. | |
| 6,529,995 B1 | 3/2003 | Shepherd | |
| 6,625,592 B1 | 9/2003 | Dyer et al. | |
| 6,874,072 B2 | 3/2005 | Aasland | |
| 6,915,302 B1 | 7/2005 | Christofferson et al. | |
| 7,039,764 B1 | 5/2006 | Shetty et al. | |
| 7,085,229 B1 | 8/2006 | Potter et al. | |
| 7,209,932 B2 | 4/2007 | Dewey | |
| 7,216,207 B1 | 5/2007 | Armstrong-Crews et al. | |
| 7,370,048 B2 | 5/2008 | Loeb | |
| 7,464,168 B1 * | 12/2008 | Abdelaziz | H04L 67/104 709/229 |
| 7,587,408 B2 | 9/2009 | Snapp et al. | |
| 7,664,731 B2 | 2/2010 | Snapp et al. | |
| 5,893,120 C1 | 4/2011 | Nemes | |
| 5,893,120 C2 | 9/2011 | Nemes | |
| 8,019,768 B1 | 9/2011 | Steigerwald et al. | |
| 8,108,399 B2 | 1/2012 | Dumitru et al. | |
| 8,117,462 B2 | 2/2012 | Snapp et al. | |
| 8,165,146 B1 | 4/2012 | Melick | |
| 8,291,234 B2 | 10/2012 | Snapp et al. | |
| 8,306,958 B2 | 11/2012 | Thorup | |
| 8,321,385 B2 | 11/2012 | Burroughs et al. | |
| 8,335,745 B2 | 12/2012 | Perlman et al. | |
| 8,438,242 B2 | 5/2013 | Kishimoto | |
| 8,515,965 B2 | 8/2013 | Mital et al. | |
| 8,542,695 B1 | 9/2013 | Melick et al. | |
| 2002/0032691 A1 * | 3/2002 | Rabii | G06F 17/30067 |
| 2004/0076155 A1 * | 4/2004 | Yajnik | H04L 45/306 370/389 |
| 2008/0282024 A1 * | 11/2008 | Biswas | G06F 12/0246 711/103 |

OTHER PUBLICATIONS

Richard Michael Nemes, Mikhail Lotvin, and David Garrod, U.S. Appl. No. 13/342,018, filed Dec. 31, 2011.

Jun Xu and Mukesh Singhal, Cost-Effective Flow Table Designs for High-Speed Routers: Architecture and Performance Evaluation, IEEE Trans. on Cmptrs., vol. 51(9), pp. 1089-1099.

Ex Parte Re-Examination of U.S. Pat. No. 5,893,120, Re-examination U.S. Appl. No. 90/010,856, Request filed Feb. 9, 2010, Certificate Issued Apr. 12, 2011.

Ex Parte Re-Examination of U.S. Pat. No. 5,893,120, Re-Examination U.S. Appl. No. 90/011,426, Request filed Jan. 10, 2011, Certificate Issued Sep. 20, 2011.

Bao Phan, Randall Atkinson, and Dan McDonald, key.c, Key Management Engine for BSD, Naval Research Laboratory (NRL), 1995, p. 29.

D. E. Knuth,The Art of Computer Programming, vol. 3, Sorting and Searching, Addison-Wesley, Reading, Massachusetts, 1973, pp. 506-549.

R. L. Kruse, Data Structures and Program Design, Second Edition, Prentice-Hall, Incorporated, Englewood Cliffs, New Jersey, 1987, Section 6.5 and Section 6.6.

D. F. Stubbs and N. W. Webre, Data Structures with Abstract Data Types and Pascal, BrooksCole Publishing Company, Monterey, California, 1985, Section 7.4.

U.S. Appl. No. 10/345,067, filed Jul. 31, 2003, Jeremy De Bonet.
U.S. Appl. No. 12/827,419, filed Dec. 8, 2011, Eric Bouillet et al.

* cited by examiner

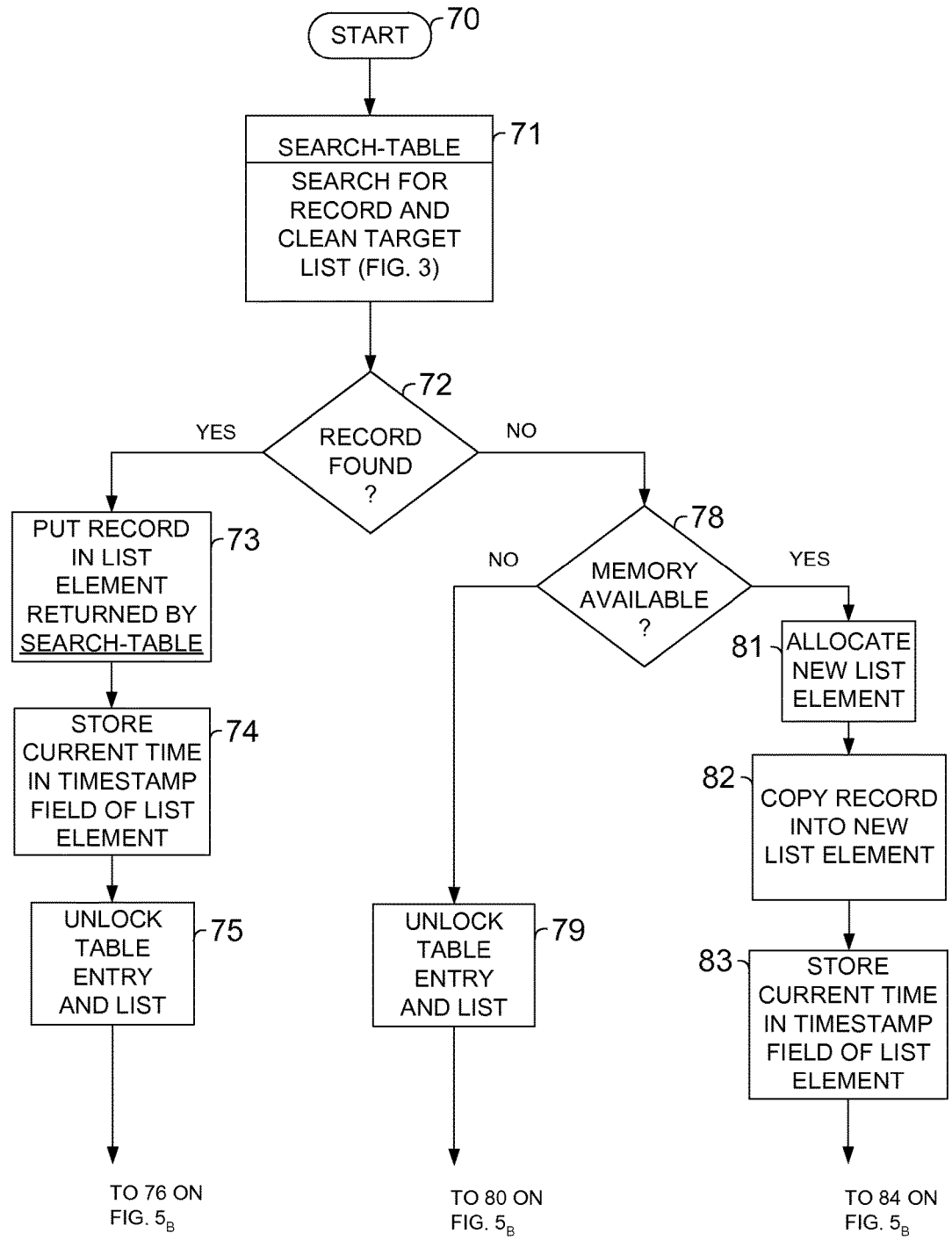
FIG. 5_A

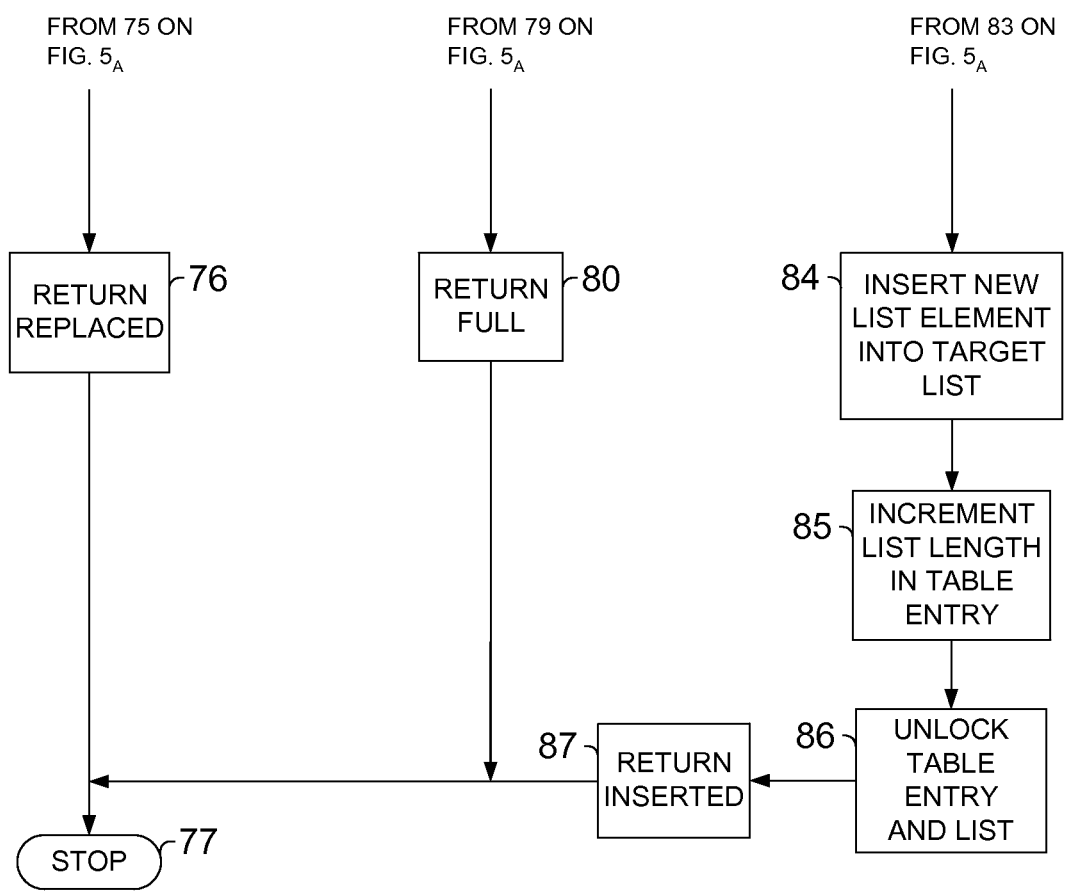
FIG. 5<sub>B</sub>

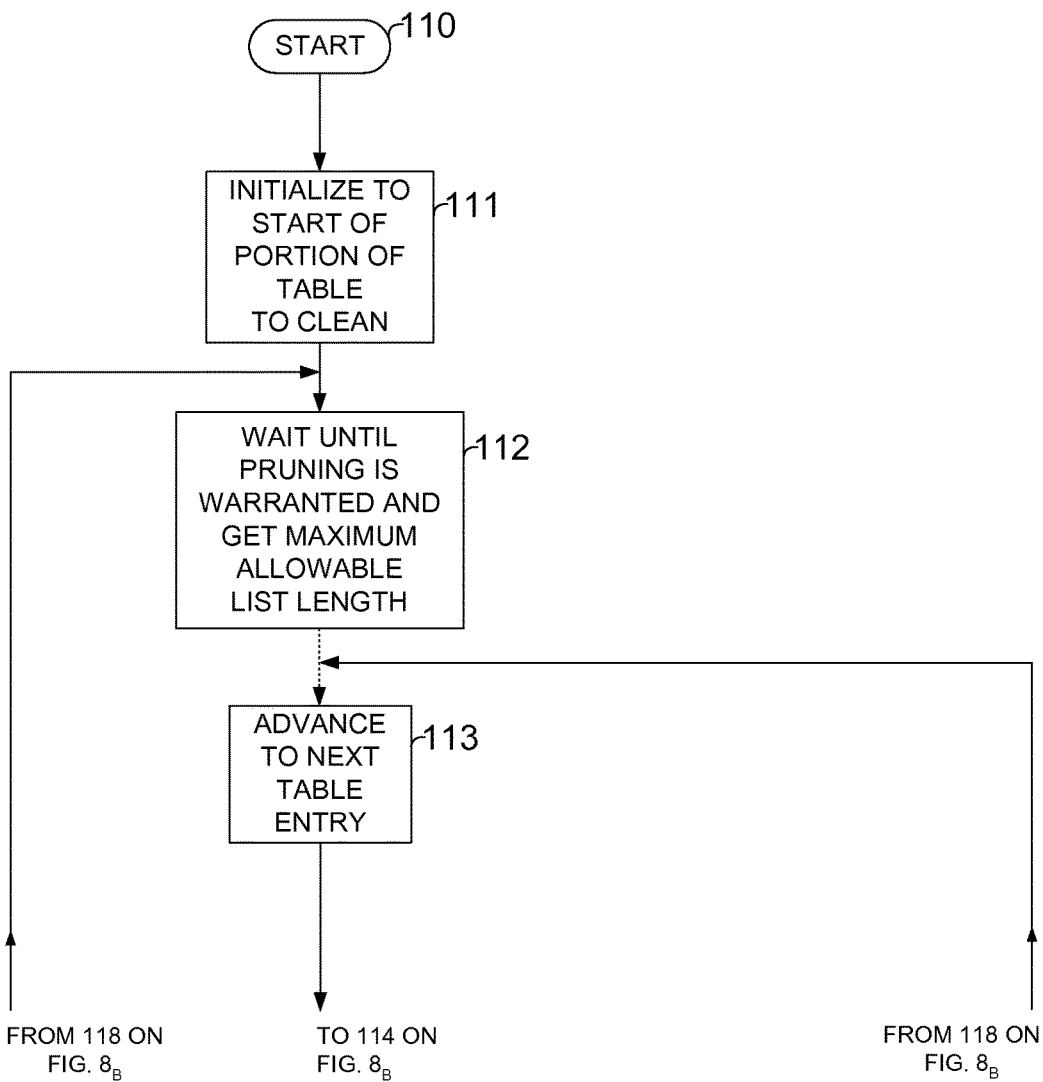
FIG. 8_A

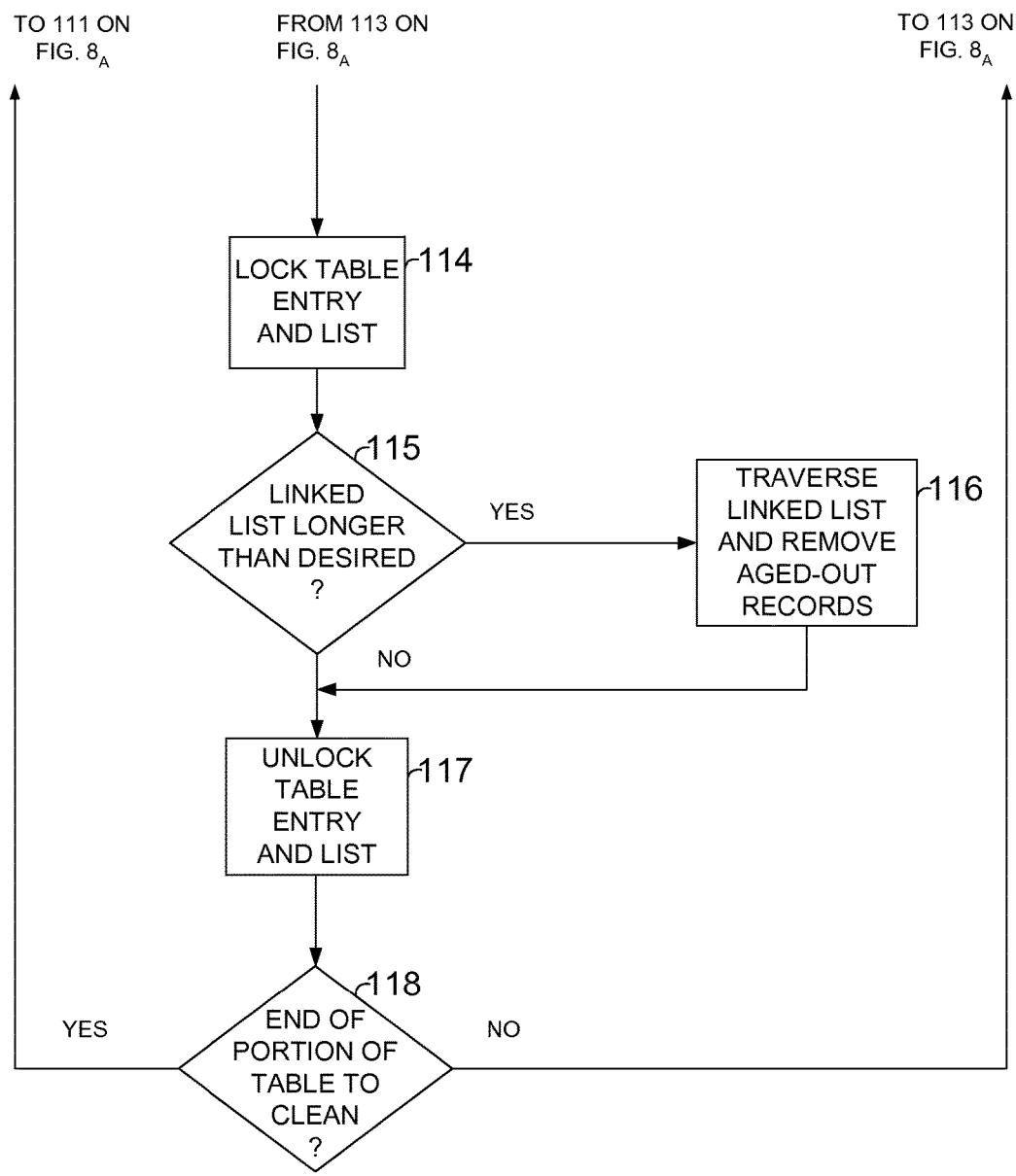
FIG. 8_B

US 9,690,699 B1

METHODS AND APPARATUS FOR INFORMATION STORAGE AND RETRIEVAL USING A CACHING TECHNIQUE WITH EXTERNAL-CHAIN HASHING AND DYNAMIC RESOURCE-DEPENDENT DATA SHEDDING

CROSS REFERENCE TO RELATED APPLICATIONS

This application is a continuation of U.S. patent application Ser. No. 13/906,191, filed May 30, 2013.

BACKGROUND OF THE INVENTION

This invention relates to information storage and retrieval systems, and, more particularly, to the use of hashing techniques in caching systems.

Techniques for caching frequently-used data have been used for many decades, and provide fast access to information that would otherwise require long retrieval times or lengthy computation. A cache is a storage mechanism that holds a desired subset of data that is stored in its entirety elsewhere, or data that results from a lengthy computation. Its purpose is to make future accesses to a stored data item faster. A cache is usually dynamic in nature: items stored in it may not reside there permanently, and frequently those items whose future value is questionable are replaced by items predicted to be more valuable. Typically, but not exclusively, older items are replaced by newer ones. Successful application of caching can be found in the routing caches used by Internet servers to provide quick real-time access to network routing information, for example, though its general usefulness makes it a popular technique used in many other areas of computing as well. Since particular data items stored in the cache may become less valuable over time, based on the state of the system or for other reasons, a mechanism that allows for the effective, efficient, and flexible removal of less valuable data is beneficial.

Records stored in a computer-controlled storage mechanism such as a cache are retrieved by searching for a particular key value among stored records, a key being a distinguished field (or collection of fields) in a record, which is defined to be a logical unit of information. The stored record with a key matching the search key value is then retrieved. Though data caching can be done using a variety of techniques, the use of hashing has become a popular way of building a cache because of its speed advantage over other information retrieval methods. Hashing is fast compared to other information storage and retrieval methods because it requires very few key comparisons to locate a requested record.

Hashing methods use a hashing function that operates on—technical term is maps—a key to produce a storage address in the storage space, called the hash table, which is a large one-dimensional array of record locations. This storage address is then accessed directly for the desired record. Hashing techniques are described in the classic text by D. E. Knuth entitled *The Art of Computer Programming*, Volume 3, Sorting and Searching, Addison-Wesley, Reading, Mass., 1973, pp. 506-549, in *Data Structures and Program Design*, Second Edition, by R. L. Kruse, Prentice-Hall, Incorporated, Englewood Cliffs, N.J., 1987, Section 6.5, "Hashing," and Section 6.6, "Analysis of Hashing," pp. 198-215, and in *Data Structures with Abstract Data Types and Pascal*, by D. F. Stubbs and N. W. Webre, Brooks/Cole Publishing Company, Monterey, Calif., 1985, Section 7.4, "Hashed Implementations," pp. 310-336.

Hashing functions are designed to translate the universe of keys into addresses uniformly distributed throughout the hash table. Typical hashing functions include truncation, folding, transposition, and modulo arithmetic. Cyclic redundancy check (CRC) functions are occasionally used as hashing functions.

A disadvantage of hashing is that more than one key will inevitably translate to the same storage address, causing collisions in storage. Some form of collision resolution must therefore be provided. Resolving collisions within the hash table itself by probing other elements of the table is called open addressing. For example, the simple open-addressing strategy called linear probing views the storage space as logically circular and consists of sequentially scanning in a forward direction from the initial storage address to the first empty storage location.

Another method for resolving collisions is called external chaining. In this technique, each hash table location is a pointer to the head of a linked list of records, all of whose keys map under the hashing function to that very hash table address. The linked list is itself searched sequentially when retrieving, inserting, or deleting a record, and insertion and deletion are done by adjusting pointers in the linked list. External chaining can make better use of memory than open addressing because it doesn't require initial pre-allocation of maximum storage and easily supports concurrency with the ability to lock individual linked lists.

BRIEF SUMMARY OF THE INVENTION

In accordance with the illustrative embodiment of the invention, an effective, efficient, and flexible way of removing unwanted data by using an external-chain hashing technique is disclosed. It features on-the-fly garbage collection based on dynamically defined record age-out, in combination with parallel global background garbage collection guided by dynamically defined maximum chain length. In particular, during regular record insertion or retrieval or deletion operations in the cache, records older than a dynamically determined amount of time are identified and removed from the external chain linked list. Specifically, aged-out records in the linked list are removed as part of the regular hash table search procedure. In addition, an auxiliary background garbage collector process (or group of garbage collector processes) operate in parallel to prune excessively long external chain linked lists of aged-out records. This incremental pruning of the chains has the decided advantage of automatically eliminating unwanted records without requiring that the cache be taken out of service for garbage collection. This is particularly important for an information storage system, such as a cache, that must provide continuous availability to its client programs.

Another feature of the invention is that both the dynamically determined age-out time and the dynamically determined maximum chain length can be functions of many factors, some local, some global, making it adaptable to any execution environment. They can be modified and adjusted to tune the system to best protect against the harmful effects of long chains.

BRIEF DESCRIPTION OF THE SEVERAL VIEWS OF THE DRAWING

A complete understanding of the present invention may be gained by considering the following detailed description in conjunction with the accompanying drawing, in which:

FIG. 5, displayed as FIGS. 5$_A$ and 5$_B$, shows a general flowchart for a record insertion procedure that might be used in a hashed cache storage system in accordance with the present invention;

FIG. 8, displayed as FIGS. 8$_A$ and 8$_B$, shows a general flowchart for a garbage collector process that might be used in a hashed cache storage system in accordance with the present invention.

DETAILED DESCRIPTION OF THE INVENTION

Figure 1:
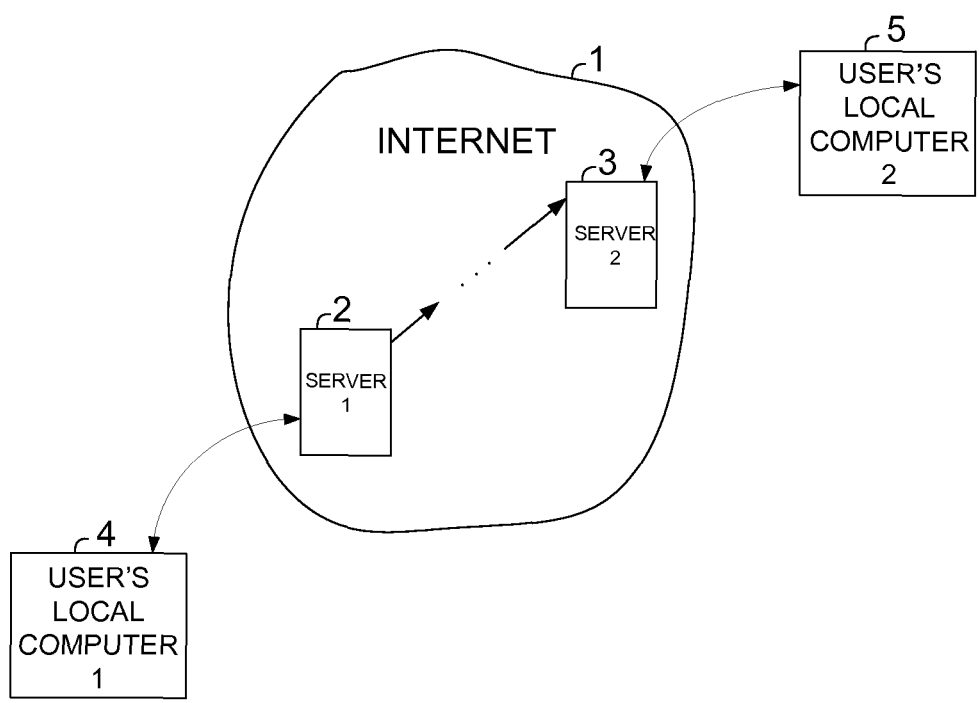
FIG. 1 shows a computer network environment in which a hashed cache storage system in accordance with the present invention might be used.

FIG. 1 of the drawings shows a general block diagram of the physical hardware components of an electronic computer network, such as the Internet 1, comprising an interconnection of computers, some of which constitute the network's communication and service backbone, called servers 2-3, and others which are directly accessed by end users, shown as user's local computers 4-5. Electronic communication between computers in the network can be wired and/or wireless.

The information storage and retrieval system of the preferred embodiments resides in the physical memory, which is electronic, of a single computer, or several computers. Those computers may be part of a computer network, but need not be so. The computer can be virtually any type of computer or electronic computing device, including, but not limited to, a supercomputer, a mainframe computer, a server computer 2-3, a desktop computer, a laptop computer, a notepad computer, a portable electronic device, a mobile computing device, a smartphone, or a distributed computing system comprised of multiple computers. The operation of the preferred embodiments is provided by computer software that resides in the computer's physical memory and is executed by a processor (or several processors) of the computer, which typically contains an internal clock circuit whose regular pulses regulate the processor micro-operations and is used to measure the passage of time. When executing, the software instructions stored in memory cause the computer to perform specific actions and exhibit specific behavior, as described below in connection with the preferred embodiments. Generally, the execution of computer software by a processor or several processors is well known in the art. Processors may be microprocessors or any other type of processors as known in the art. Physical computer memory is well known in the art and may include, for example, random access memory (RAM). As known in the art, computer memory and processors may interact and communicate information over an address/data bus. A computer may also include well-known secondary memory data storage devices, such as hard-disk drives, for example, which provide extended memory for physically storing instructions and data. A computer may have attached to it peripheral devices that allow user interaction, such as keyboards, pointer devices, display monitors, touch screens, DVD drives, printers, and scanners, for example. Computers typically include electronic signal generating and receiving devices for communication with other devices in a network, as known in the art, including communications over the Internet 1. Such devices may provide wired and/or wireless communication functionality, and are typically supported by the computer's software.

Figure 2:
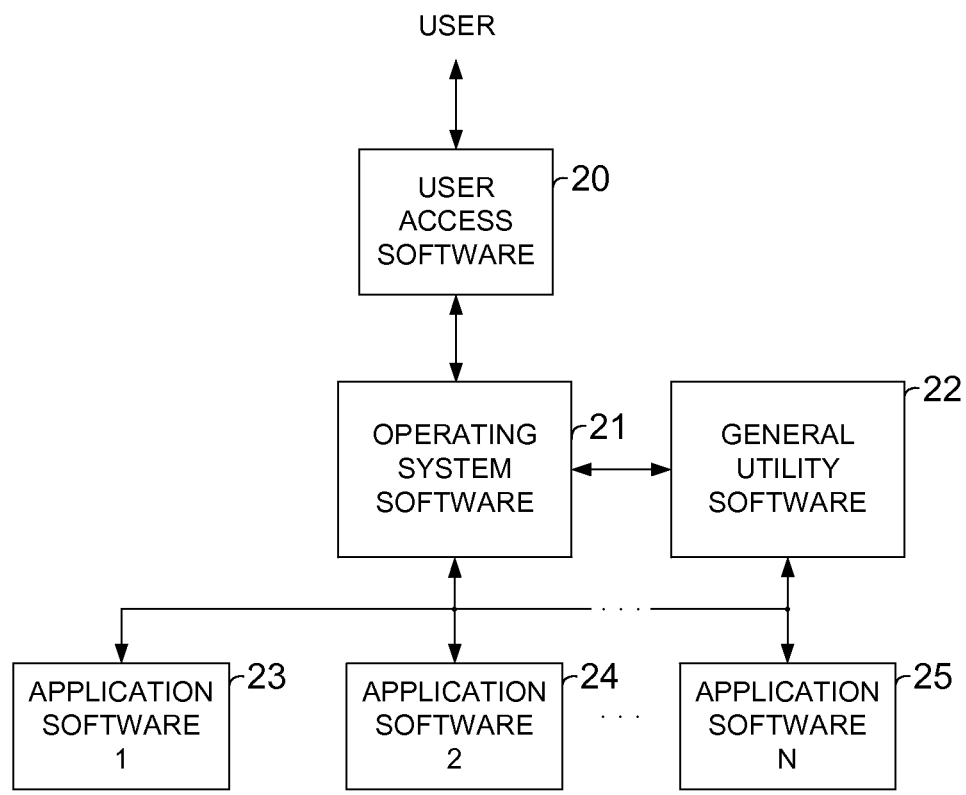
FIG. 2 shows a general block diagram of a computer's software organization that might be used in a hashed cache storage system in accordance with the present invention.

FIG. 2 shows a graphical depiction of the typical software structure of a computer. The software of FIG. 2 includes a user interaction component 20, which in many computers might be part of, and integrated into, the computer's Operating System 21, which coordinates the activities of all the computer's hardware components. A typical computer also contains utility software 22, some or all of which might be part of, and integrated into, the computer's Operating System 21. General utilities 22 might, for example, include basic file access and manipulation software, hardware and software maintenance facilities, and computer security protection software.

The computer software system of FIG. 2 typically also includes application programs, such as application software 23, 24, . . . , 25. Application software 23 through 25 might, for example, include an Internet Web browser, document formatting software, spreadsheet software, a database management system, and a game program.

The present invention is concerned with information storage and retrieval. It can be application software packages 23-25, or used by other parts of the system, such as user access software 20, Operating System software 21, or general utility software 22. The information storage and retrieval technique described by the present invention are herein disclosed as flowcharts in FIGS. 3 through 8, and shown as PASCAL-like pseudocode in the APPENDIX below.

Before describing one particular preferred embodiment of the present invention, it is first helpful to understand hashing techniques in general. Many fast techniques for storing and retrieving data are known in the prior art. In situations where storage space is considered cheap compared with retrieval or computation time, a technique called hashing is often used. In classic hashing, each record in the information storage system includes a distinguished field (or collection of fields) usually unique in value to each record, called the key, which is used as the basis for storing and retrieving the associated record.

Taken as a whole, a hash table is a large, one-dimensional array of logically contiguous, consecutively numbered, fixed-size storage units. Such a table of records is typically stored in the physical memory of the computer, typically RAM, where each record is an identifiable and addressable location or group of locations in physical memory. A hashing function converts the key into a hash table array subscript, which is used as an index into the array where searches for the data record begin. The hashing function can be any operation on the key that results in subscripts mostly uniformly distributed across the table. Known hashing functions include truncation, folding, transposition, modulo arithmetic, and combinations of these operations. Unfortunately, hashing functions generally do not produce unique locations in the hash table, in that many distinct keys map to the same table slot, producing what are called collisions.

Some form of collision resolution is required in all hashing systems. When a collision occurs, finding an alternate location for a collided record is necessary. Moreover, the alternate location must be effectively reachable during future searches for the dislocated record.

A common collision resolution strategy, with which the present invention is concerned, is called external chaining. Under external chaining, each hash table entry stores all of the records that collided at that location by storing not the records themselves, but by storing a pointer to the head of a linked list of those same records. Such linked lists are formed by storing the records individually in dynamically allocated storage and maintaining with each record a pointer to the location of the next record in the chain of collided records. When a search key is hashed to a hash table entry, the pointer found there is used to locate the first record. If the search key does not match the key found there, the pointer there is used to locate the second record. In this way, the chain of records is traversed sequentially until the desired record is found or until the end of the chain is reached. Deletion of records involves merely adjusting the pointers to bypass the deleted record and returning the storage it occupied to the available storage pool maintained by the system.

Hashing has long been recognized as a valuable way to implement a data cache, and many successful systems indeed use hash-based caches. But hash tables are highly vulnerable to degradation of service, especially when the hashing function used by the system does not distribute records uniformly. Non-uniform hashing functions cause an extremely large number of table collisions, thereby overwhelming the cache and rendering it a liability instead of an asset. To counteract this, system developers have used techniques that limit the impact of collisions by not storing excessively collided records in the cache. But the techniques developed thus far do not shed records gradually and smoothly as the table load increases. Instead, they react abruptly when a local threshold is reached, namely, when a particular chain reaches a predetermined maximum length. The present invention discloses a technique for limiting the impact of non-uniform hashing functions on an external-chain hash table by gradually eliminating aged-out records, either on-the-fly or by a background process, always seeking to maintain table equilibrium without the need for sudden, sporadic, and abrupt action taking place as the cache enters a problematic state.

The preferred embodiment of the present invention shown here is comprised of two components: an on-the-fly component that executes synchronously with the cache's client code, and a background process (or task or thread) component that operates asynchronously with respect to client code. The two components exist side-by-side, the only interaction between them being the requisite synchronization needed to ensure freedom from interference. In the preferred embodiment, the two components share certain data definitions and system constants needed to ensure flawless compatibility.

On-the-Fly Component

FIGS. 3 through 7 describe the on-the-fly component of the preferred embodiment of the present invention. FIG. 8 describes the background process component, which is described in the next section. We begin with the on-the-fly component.

The on-the-fly component is, preferably, a collection of software procedures that are callable by the cache's client code. These procedures can be used in an arrangement in which the client code is single-threaded or multi-threaded, and a person of ordinary skill in the art has the requisite knowledge to adapt the procedures to the particular execution environment. The purpose of each procedure is to allow the client code to store, retrieve, or delete a data record. In the course of storing, retrieving, or deleting a record, the procedure will also, as a side effect, remove aged-out records from the target chain.

Figure 3:
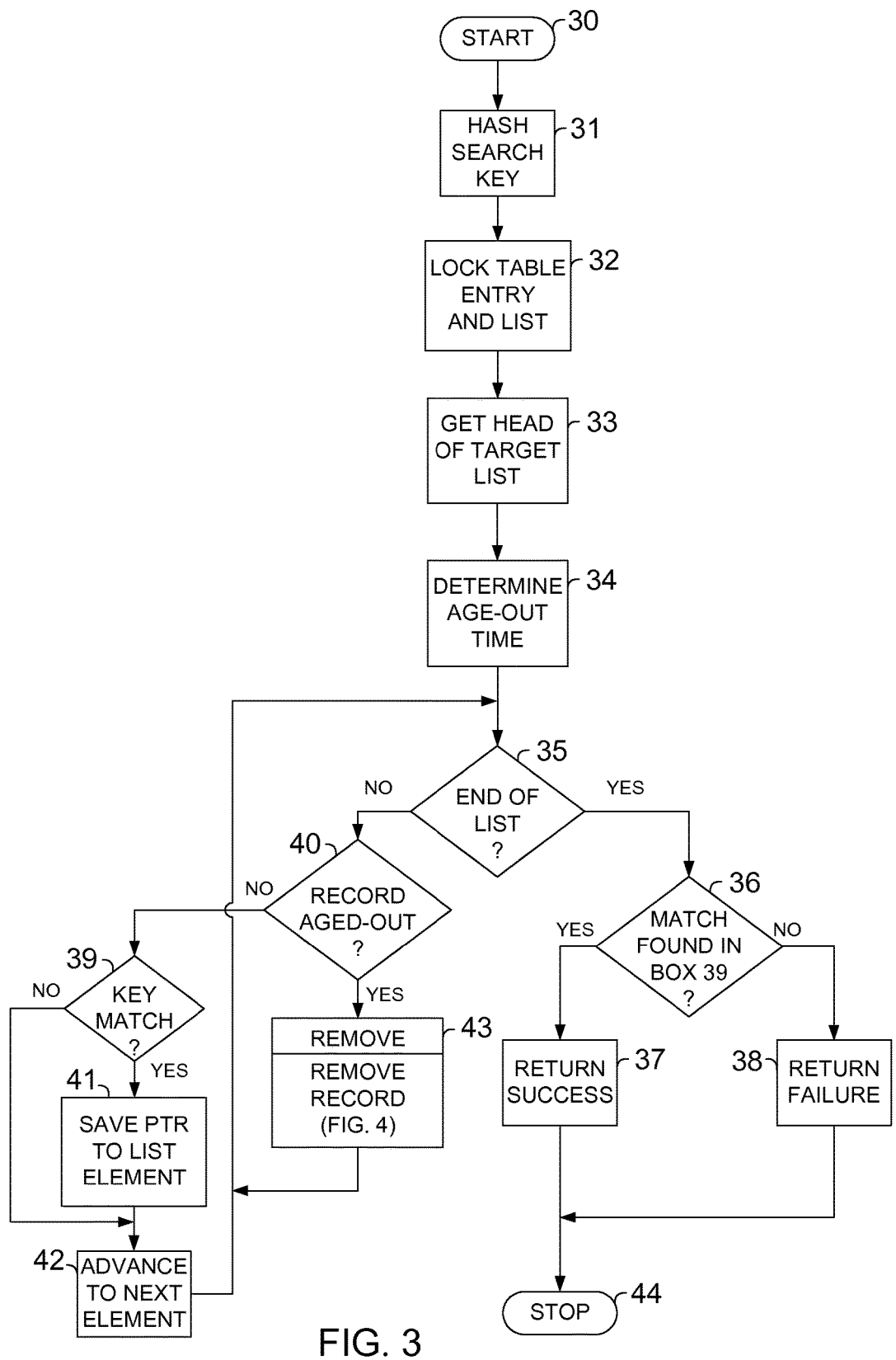
FIG. 3 shows a general flowchart for a search table procedure that might be used in a hashed cache storage system in accordance with the present invention.

Referring then to FIG. 3, shown there is a detailed flowchart of a search table procedure for searching the hash table preceding the actual insertion, retrieval, or deletion of a record, in accordance with the present invention, and involving the dynamic on-the-fly removal of aged-out records in a targeted linked list. The procedure traverses the linked list associated with the table entry to which the hashing function mapped, testing each element in turn to determine if the record has aged out and, if not, testing if a match has been found.

Starting then in box 30 of the search table procedure of FIG. 3, the key of the record that is being searched for is hashed in box 31 to provide the index (i.e., subscript) of an array entry, which contains a pointer to the start of the linked-list chain associated with that table element. In the preferred embodiment, each array entry also contains the length of the linked list associated with that table element. In addition to the length of the linked list, other embodiments may include other data in each array entry as well. Some embodiments may choose not to include the length. With the purpose of avoiding interference from other programs that share access to the cache and execute concurrently with this one, such as, for example, other parallel threads or background processes, the array entry and associated linked list are then locked in box 32 to provide exclusive access to the table entry and linked list. There are several locking mechanisms available, all known to be equivalent in their capacity to prevent interference. These include, but are not limited to, semaphores, monitors, critical regions, spin locks, test-&-set instructions, and locks. (Though "mutex" semaphores, with their well-known P and V operations, are used as the synchronization primitive of the preferred embodiment shown in the PASCAL-like pseudocode appearing in the APPENDIX, other embodiments may use other synchronization mechanisms.) Some embodiments may choose not to use any locking mechanism or synchronization scheme whatsoever.

In box 33, the hash table array location indicated by the subscript generated in box 31 is accessed to provide the pointer to the start of the target linked list. Following that, the time of age-out is calculated in box 34, immediately prior to traversing the list. The age-out computation calculates an amount of time younger than which records are not currently considered aged-out. Preferably, the age-out value will be lower when the system is stressed and higher when the system is not under pressure. Stress can be global, such as the reserve of free memory being low, or it can be local, such as a particular chain being unacceptably long. The age-out value can be a constant, or a function of many existing factors—some local, some global—such as, for example, the length of a linked list that is about to be traversed, the amount of free memory that is available at the time, the amount of memory that is unavailable at the time, general system load, cache system load, cache age, time of day, day of the year, occurrence of an event, and combinations of these, as well as other factors both internal and external to the information storage and retrieval system. This age-out value is used by decision box 40, described below, to determine whether a record has aged out and is to be removed from the list. Included in the APPENDIX below is an example of an age-out procedure, shown as PASCAL-like pseudocode, whose computation is based solely on a local condition, namely, the length of the linked list to be traversed. It is a monotonically nonincreasing function of the length of the list. Also shown in the APPENDIX are two alternate age-out procedures, the first being a function solely of the fraction of memory available, and the second being a function of both the fraction of memory available and the current system load. Both alternate age-out procedures shown below are functions of global system conditions. Based on what is shown there, a person of ordinary skill in the art will have no difficulty adapting which is disclosed in the APPENDIX to any particular execution environment.

Following the age-out computation, the procedure enters decision box 35 to examine the pointer value that guides the list traversal to ascertain whether the end of the linked list has been reached, indicating that the linked list has been fully traversed. If the end has been reached, decision box 36 is entered to determine if a key match was previously found in decision box 39 and a pointer to the matched record saved in box 41, as will be described below. If so, the search is successful and returns success in box 37, followed by the procedure's termination in terminal box 44. If not, box 38 is entered to report failure, and the procedure again terminates in box 44.

If the end of the list has not been reached as determined by decision box 35, decision box 40 is entered to determine if the record pointed to has aged out. This is determined by using the current system time along with a timestamp value, which in the preferred embodiment is stored in each list item along with the record, in a comparison with the age-out time calculated earlier in box 34, which was described above. (Other embodiments may choose not to store a timestamp in each list element, and may choose, alternatively, to store different data instead, such as an integer sequencer, for example. Still other embodiments may choose not to store any additional data whatsoever.) If the record has not aged-out, decision box 39 is entered to determine if the key in this record matches the search key. If it does, the record's memory location is saved in box 41 and box 42 is entered. If the record does not match the search key, the procedure bypasses box 41 and proceeds directly to box 42. In box 42, the procedure advances forward to the next record in the linked list and the procedure returns to box 35.

If decision box 40 determines that the record under question has aged out, box 43 is entered to perform the on-the-fly removal of the aged-out record from the linked list and the return of the storage it occupies to the system storage pool, as will be described in connection with FIG. 4. In general, invoking the linked-list element remove procedure of box 43 (FIG. 4) operates to remove an element from the linked list by adjusting its predecessor's pointer to bypass that element. (However, if the element to be removed is the first element of the list, then there is no predecessor and the hash table array entry is adjusted instead.) On completion of procedure remove invoked from box 43, the search table procedure returns to box 35.

It can be seen that the search table procedure of FIG. 3 operates to examine the entire linked-list chain of records of which the searched-for record is a part, and to remove aged-out records, returning storage to the storage pool with each removal. If the storage pool is depleted and many aged-out records remain despite on-the-fly and background process garbage collection, then the insertion of new records is inhibited (box 78 through 80 of FIG. 5) until a deletion is made by the record deletion procedure (FIG. 7) or until the search table procedure and background process have had a chance to replenish the storage pool.

In the preferred embodiment, the search table procedure shown in FIG. 3 and implemented in the APPENDIX as PASCAL-like pseudocode appears as a separate procedure that is invoked by the insertion (FIG. 5), retrieval (FIG. 6), and deletion procedures (FIG. 7), as described below. In other embodiments, it, or parts of it, may be incorporated into one or more of those procedures themselves.

Though the search table procedure as shown in FIG. 3, implemented in the APPENDIX as PASCAL-like pseudocode, and described above appears in connection with an information storage and retrieval system using the hashing technique with external chaining, its on-the-fly removal technique while traversing a linked list can be used anywhere a linked list of records with aged-out data appears, even in contexts unrelated to hashing. (Included in the APPENDIX is a search linked list procedure implemented as PASCAL-like pseudocode that shows how a linked list unrelated to hashing can be rid of its aged-out records on-the-fly while being searched.) A person skilled in the art will appreciate that this technique can be readily applied to manipulate linked lists not necessarily associated with hashing.

The search table procedure shown in FIG. 3, implemented as pseudocode in the APPENDIX, and described above traverses the entire linked list removing all records that have aged out as it searches for a key match. The procedure can be readily adapted to remove some but not all of the aged-out records, thereby shortening the linked-list traversal time and speeding up the search at the expense of perhaps leaving some aged-out records in the list. For example, the procedure can be modified to terminate when a key match occurs. The implementer even has the prerogative of choosing among these strategies dynamically at the time the search table procedure is invoked, thus sometimes removing all aged-out records, at other times removing some but not all of them, and yet at other times choosing to remove none of them. Such a dynamic runtime decision might be based on factors such as, for example, the length of the linked list, how much memory is available in the system storage pool, general system load, time of day, the number of records currently residing in the information system, and other factors both internal and external to the information storage and retrieval system itself. A person skilled in the art will appreciate that the technique of removing all aged-out records while searching the linked list can be expanded to include techniques whereby not necessarily all aged-out records are removed, and that the decision regarding if and how many records to eliminate can be a dynamic one.

Figure 4:
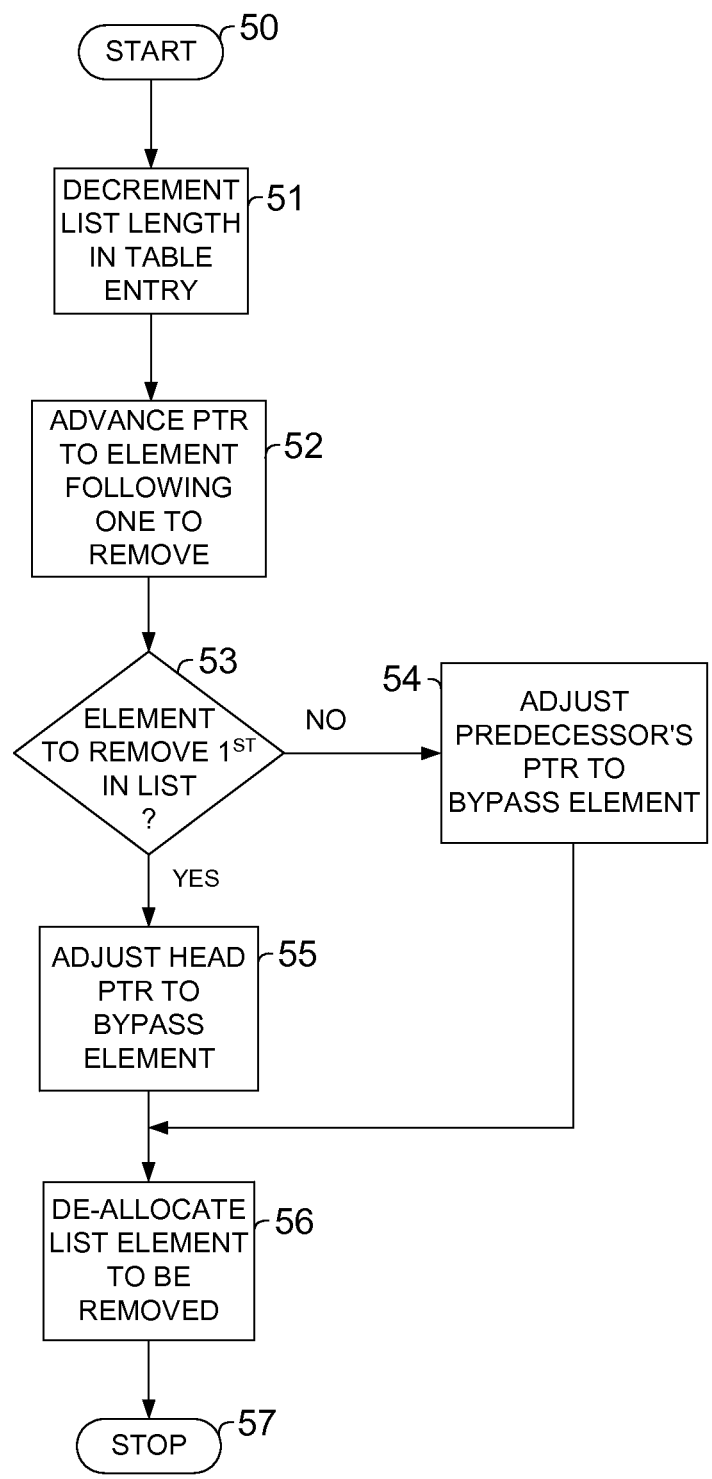
FIG. 4 shows a general flowchart for a linked-list element remove procedure that might be used in a hashed cache storage system in accordance with the present invention.
Figure 7:
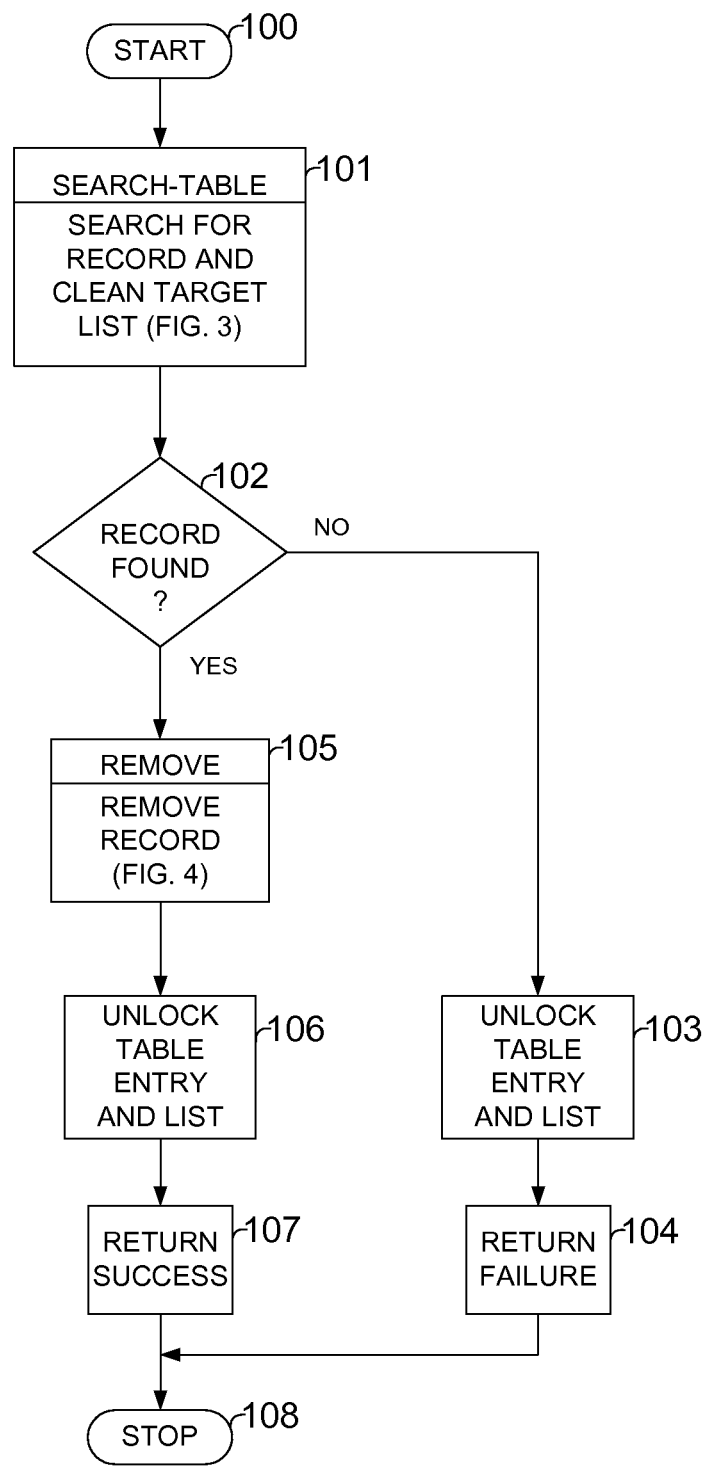
FIG. 7 shows a general flowchart for a record deletion procedure that might be used in hashed cache storage system in accordance with the present invention.

FIG. 4 shows a detailed flowchart of a linked-list element remove procedure that removes a record from the information storage and retrieval system, either a record that has not aged out (through the record deletion procedure, as will be noted in connection with FIG. 7), or an aged-out record through the search table procedure as noted in connection with FIG. 3 above. In general, this is done by the invoking procedure, being either the record deletion procedure (FIG. 7) or the search table procedure (FIG. 3), passing to the linked-list element remove procedure a pointer to a linked-list element to remove, a pointer to that element's predecessor element in the same linked list, and the subscript of the hash table array location containing the pointer to the head of the linked list from which the element is to be removed. In the case that the element to be removed is the first element of the linked list, the predecessor pointer passed to the linked-list element remove procedure by the invoking procedure has the nil (sometimes called null, or empty) value, indicating to the linked-list element remove procedure that the element to be removed has no predecessor in the list. The invoking procedure expects the linked-list element remove procedure, on completion, to have advanced the passed pointer that originally pointed to the now-removed element so that it points to the successor element in that linked list, or nil if the removed element was the final element. (The search table procedure of FIG. 3, in particular, makes use of the linked-list element remove procedure's advancing this passed pointer in the described way; it is made use of by advancing directly to box 35 of FIG. 3 following completion of box 43, as was described above in connection with FIG. 3.)

The linked-list element remove procedure causes actual removal of the designated element by adjusting the predecessor pointer so that it bypasses the element to be removed. In the case that the predecessor pointer has the nil value, the hash table array entry indicated by the passed subscript plays the role of the predecessor pointer and is adjusted the same way instead. Following pointer adjustments, the storage occupied by the removed element is returned to the system storage pool for future allocation.

Beginning, then, at starting box 50 of FIG. 4, the linked-list length that is stored in each table entry in the preferred embodiment is decremented in box 51, indicating that the list will now contain one fewer element. (It is incremented in box 85 of FIG. 5, as described below in conjunction with FIG. 5.) The pointer to the list element to remove is advanced in box 52 so that it points to its successor in the linked list. Next, decision box 53 determines whether the element to remove is the first element in the containing linked list by testing the predecessor pointer for the nil value, as described above. If so, box 55 is entered to adjust the linked list head pointer in the hash table array to bypass the first element, after which the procedure continues on to box 56. If not, box 54 is entered where the predecessor pointer is adjusted to bypass the element to remove, after which the procedure proceeds, once again, to box 56. Finally, the storage occupied by the bypassed element is returned to the system storage pool in box 56, following which the procedure terminates in terminal box 57.

In the preferred embodiment, the linked-list element remove procedure shown in FIG. 4 and implemented in the APPENDIX as PASCAL-like pseudocode appears as a separate procedure that is invoked by the search table procedure (FIG. 3), record deletion procedure (FIG. 7), and garbage collector process (FIG. 8), as described above and below. In other embodiments, it, or parts of it, may be incorporated into one or more of those procedures and/or processes themselves.

FIG. 5, displayed as FIGS. $5_A$ and $5_B$, shows a detailed flowchart of a record insertion procedure suitable for use in the information storage and retrieval system of the present invention. It begins at starting box 70, from which box 71 is entered. In box 71, the search table procedure of FIG. 3 is invoked with the search key of the record to be inserted. As noted in connection with FIG. 3, the search table procedure finds the linked-list element whose key value of the record contained therein matches the search key and, at the same time, removes aged-out records on-the-fly from that linked list. Decision box 72 is then entered to determine whether the search table procedure found a record with matching key value. If so, box 73 is entered, where the record to be inserted is stored over the old record, thus replacing it. In box 74, the current system time is assigned to the timestamp field included in each list element in the preferred embodiment. (The timestamp is used in deciding whether a record has aged-out, as described above in connection with box 40 of FIG. 3.) Since the procedure has completed its action and will no longer be accessing the table entry or linked list, it enters box 75 to unlock the table entry and linked list that were locked in box 32 of FIG. 3, as discussed above in connection with FIG. 3. After that, the record insertion procedure reports that the old record has been replaced by the new record in box 76, followed by termination in terminal box 77.

Returning to decision box 72, if a matching record is not found, decision box 78 is entered to determine if there is sufficient storage in the system storage pool to accommodate a new linked-list element. If not, the table entry and linked list that were locked in box 32 of FIG. 3 are unlocked in box 79, and the procedure reports that the storage system is full and the record could not be inserted. Subsequently, the procedure terminates in terminal box 77.

If decision box 78 determines that sufficient storage can be allocated from the system storage pool for a new linked-list element, then box 81 is entered to allocate the required memory. In box 82, the record to be inserted is copied into the storage allocated in box 81, and box 83 is entered, where once again the current system time is assigned to the timestamp field of the new list element. In box 84, the linked-list element containing the record that was copied into it in box 82 is inserted into the linked list associated with the table element to which the contained record hashed. The procedure then enters box 85 where the linked-list length that is stored in each table entry in the preferred embodiment is incremented, indicating that the list will now contains one additional element. (It is decremented in box 51 of FIG. 4, as described above in conjunction with FIG. 4.) Following that, box 86 is entered to unlock the table entry and linked list that were locked in box 32 of FIG. 3, after which the procedure reports in box 87 that the record was inserted into the information storage and retrieval system. Finally, the procedure terminates in terminal box 77.

Figure 6:
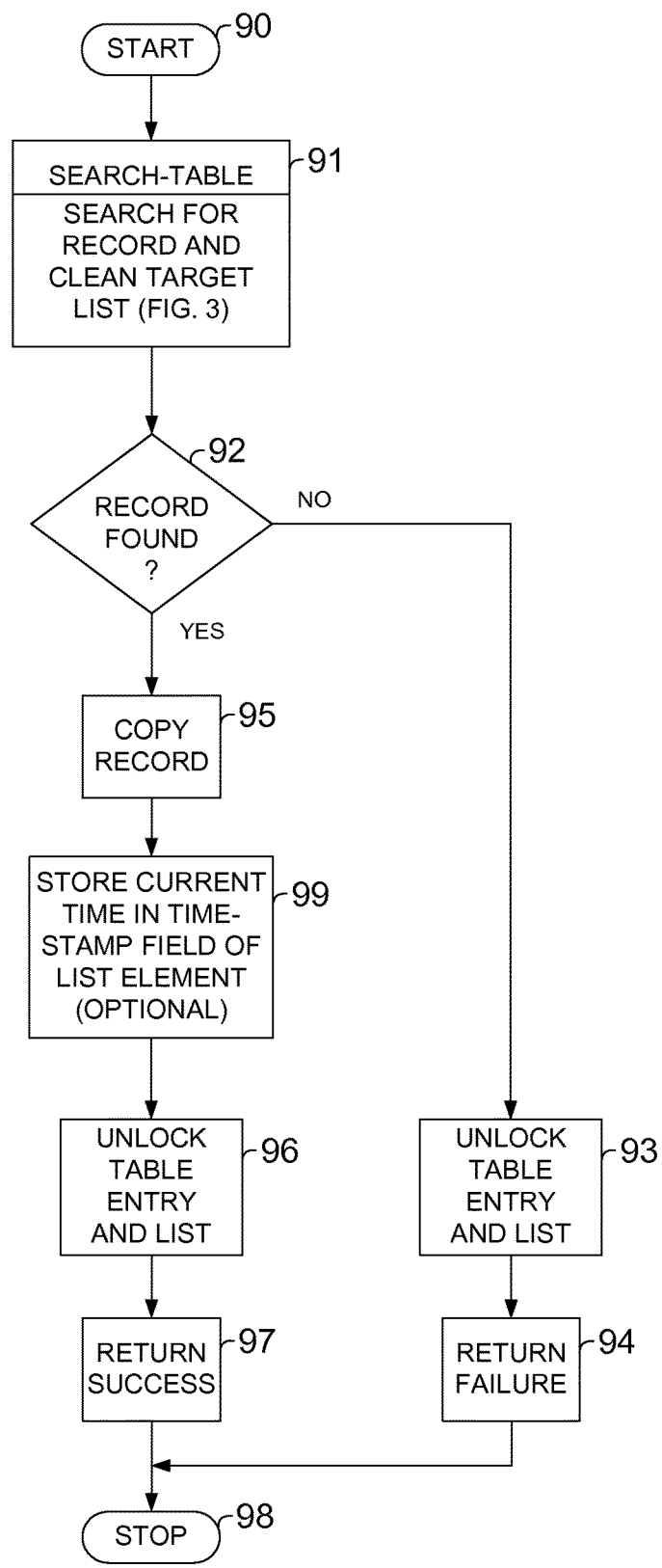
FIG. 6 shows a general flowchart for record retrieval procedure that might be used in a hashed cache storage system in accordance with the present invention.

FIG. 6 shows a detailed flowchart of a record retrieval procedure that might be used in a hashed cache storage system in accordance with the present invention. Starting in box 90, the search table procedure of FIG. 3 is invoked in box 91, using the key of the record to be retrieved as the search key. Next, decision box 92 determines whether a record with a matching key was found by the search table procedure. If not, box 93 is entered to unlock the table entry and linked list that were locked in box 32 of FIG. 3. The procedure then reports failure of the retrieval procedure, and the procedure terminates in terminal box 98. If a matching record was found by the search table procedure, then box 95 is entered to copy the matching record into a record store for access by the client program. Following that, the current system time is assigned to the timestamp field included in each list element in the preferred embodiment in box 99. (This is optional, and other embodiments may not save the current system time at this point. Including it prevents a record from ageing out if it is retrieved often.) Subsequently, box 96 is entered to unlock the table entry and linked list that were locked in box 32 of FIG. 3. Finally, in box 97 the procedure returns an indication that the record retrieval was successful, followed by termination in terminal box 98.

FIG. 7 shows a detailed flowchart of a record deletion procedure that might be used in a hashed cache storage system in accordance with the present invention. Starting at box 100, the search table procedure of FIG. 3 is invoked in box 101, using the key of the record to be deleted as the search key. Next, decision box 102, decides whether the search table procedure was able to find a record with matching key. If not, box 103 is entered to unlock the table entry and linked list that were locked in box 32 of FIG. 3. The procedure then reports failure of the deletion procedure in box 104, followed by termination in terminal box 108. If a matching record was found by decision box 102, the linked-list element remove procedure of FIG. 4 is invoked in box 105. As noted above in connection with FIG. 4, that procedure causes removal of a designated linked-list element from its containing linked list. Subsequently, the table entry and linked list that were locked in box 32 of FIG. 3 are now unlocked in box 106, and box 107 is then entered to report that the record deletion was successful. Finally, the procedure terminates in terminal box 108.

In the preferred embodiment, the record insertion procedure (FIG. 5), record retrieval procedure (FIG. 6), and record deletion procedure (FIG. 7), described above and implemented in the APPENDIX as PASCAL-like pseudocode, appear as separate procedures that are invoked by client programs. In other embodiments, they, or parts of them, may be incorporated into one or more of the client programs themselves.

Background Process Component

FIG. 8 describes an additional program component of the preferred embodiment of the invention. Alternative embodiments may omit this component, and yet other embodiments may include additional components.

In the background executing concurrently with client programs that invoke the procedures shown in FIGS. 3 through 7, are one or more background garbage collector processes. Their purpose is to trim excessively long chains and thereby further counteract the effects of non-uniform hashing functions, which cause chains to grow unrestrained.

Each background process is assigned a contiguous portion of the hash table (viewed circularly) to monitor, pruning those chains within its portion that are deemed excessively long. In the preferred embodiment, the assigned portions are disjoint, but in other embodiments they can overlap. The portion assigned to a process can be a small section of the table—as small as one entry long—or it can encompass the entire table. Each process endlessly traverses its assigned portion, repeatedly from beginning to end, trimming those chains that are considered too long.

In the preferred embodiment, the process scheduler dispatches the background processes based on existing conditions, scheduling more frequently, for longer time quanta, and with higher priority when the system is stressed, and scheduling less often, for shorter time quanta, and with lower priority when the system load is minimal. In the preferred embodiment, scheduling of the processes is suspended when the system is relatively quiescent. In other embodiments, scheduling of the processes can be done in a fixed and static way, ignoring the state of the system in general and of the cache in particular.

In the preferred embodiment, the computer's processor clock is set to run slower, i.e., at a lower frequency, when the background processes execute, in order to conserve battery power.

FIG. 8, displayed as FIGS. $8_A$ and $8_B$, then shows a detailed flowchart of a garbage collector process suitable for use in the information storage and retrieval system of the present invention. Starting in box 110 of FIG. 8, the process initializes itself in box 111 for the next traversal of its assigned portion of the table. Entering box 112, it then waits until receiving an indication that pruning is warranted at the current time, and if so, what the current maximum allowable list-length is.

Like the age-out procedure discussed above in connection with box 34 of FIG. 3, the current maximum list length can be a constant, or a function of many existing factors—some local, some global—such as, for example, the amount of free memory that is available at the time, the amount of memory that is unavailable at the time, general system load, cache system load, cache age, time of day, day of the year, occurrence of an event, and combinations of these, as well as other factors both internal and external to the information storage and retrieval system. This maximum list-length value is used by decision box 115, described below, to determine whether a linked list should be pruned of its aged-out records. Included in the APPENDIX below is an example of a maximum chain length procedure, shown as PASCAL-like pseudocode, whose computation is based solely on a global condition, namely, the amount of memory that is currently available. It is a monotonically nondecreasing function of the fraction of memory available. Based on what is shown there, a person of ordinary skill in the art will have no difficulty adapting which is disclosed in the APPENDIX to any particular execution environment.

Once the process receives an indication that the next traversal can begin and has a current maximum list-length value, it enters box 113. (The dashed line connecting box 112 to box 113 signifies that the process may wait before proceeding to box 113, which begins the traversal.) In box 113, the process advances to the next table entry (circularly), and then locks that table entry and associated linked list in box 114, as discussed above in connection with box 32 of FIG. 3. The process enters decision box 115 to determine if the linked list attached to this table element is longer than desired and needs pruning. It does so by comparing the linked-list length that is stored in each table entry in the preferred embodiment with the current maximum list-length value computed in box 112 above. If the linked list is longer than desired, then box 116 is entered to trim the list. It does so by computing a time of age-out immediately prior to traversing the list, much like the age-out computation discussed above in connection with box 34 of FIG. 3. The age-out computation calculates an amount of time younger than which records are not currently considered aged-out. Though the garbage collector process shown in the APPENDIX invokes the same age-out procedure as that shown in the search table procedure, in alternate embodiments a separate procedure may be invoked, or the time of age-out may even be calculated differently. After computing the time of age-out, the linked list is traversed and rid of its aged-out elements, just like the list traversal of FIG. 3, except that there is no search for a key match. After traversing the list and removing its aged-out elements, the process enters box 117.

Returning to decision box 115, if the linked list is not longer than desired, then box 116 is bypassed and the process enters box 117 directly to unlock the table entry and associated linked list that were locked in box 114. From there, the process enters decision box 118, which decides whether the end of the table portion assigned to this process is reached, i.e., the current traversal of the assigned table portion is complete. If not, the process returns to box 113 to process the next table entry. If the end of the table portion is reached, the process returns to box 111 to begin the next traversal. Because the process loops endlessly, it doesn't terminate from within. In alternate embodiments, however, the process may terminate from within.

The attached APPENDIX contains PASCAL-like pseudocode for all program components needed to implement an information storage and retrieval system operating in accordance with the present invention. Any person of ordinary skill in the art will have no difficulty implementing the disclosed system and functions shown in the APPENDIX, including programs for all common hardware and system software arrangements, on the basis of this description, including flowcharts and information shown in the APPENDIX.

It should also be clear to those skilled in the art that though the present invention describes a technique for dynamic resource-dependent data shedding for an external-chain hashing arrangement, the technique is also applicable to open-addressing arrangements. It is also clear to those skilled in the art that other embodiments of the present invention may be made by those skilled in the art without departing from the teachings of the present invention, that the invention can be used in diverse computer applications, that it is not limited to information caching or hashing, and that it is generally applicable to techniques involving linked-list and array storage.

I claim:

1. A computer-implemented method for storing and retrieving data in a computer system's memory, at least some of the data aging-out, the method comprising executing on a computer processor the steps of:
    determining an age-out time of data,
    identifying an initial location in the memory,
    searching memory for non-aged-out data with a matching key,
    identifying at least some aged-out data using the age-out time while searching for the non-aged-out data,
    determining a maximum number of data items so as to enable an auxiliary parallel global background garbage collector to select at least one portion of the memory containing an excessive number of data items in light of the maximum number of data items,
    accessing at least some of the selected portions of the memory using the garbage collector, which executes asynchronously as a separate thread with respect to searching for non-aged-out data with a matching key,
    identifying the aged-out data using the garbage collector when a memory portion is accessed by the garbage collector.

2. The method according to claim 1 wherein the step of determining the age-out time uses a local condition of the computer memory.

3. The method according to claim 2 wherein the local condition for determining the age-out time is the amount of data contained in a portion of the memory.

4. The method according to claim 1 wherein the step of determining the age-out time uses a global condition of the computer system.

5. The method according to claim 4 wherein the global condition for determining the age-out time is the amount of memory available to store new data.

6. The method according to claim 4 wherein the global condition for determining the age-out time is a system load.

7. The method according to claim 1 wherein the step of determining a maximum number of data items includes computing a numerical value that varies monotonically nondecreasingly with the amount of memory available to store new data.

8. The method according to claim 7 wherein determining the age-out time uses the amount of data contained in a portion of the memory.

9. A computer-implemented method for pruning data in a computer system's memory, at least some of the data aging-out, the method comprising executing on a computer processor the steps of:
    searching memory for non-aged-out data without using an auxiliary parallel global background garbage collector,
    determining a maximum number of data items for an auxiliary parallel global background garbage collector that executes asynchronously as a separate thread with respect to searching for non-aged-out data, to select at least one portion of the memory for identifying aged-out data contained therein,
    accessing at least some of the selected memory portions containing an excessive number of data items in light of the maximum number of data items using the garbage collector,
    identifying aged-out data using the garbage collector when a memory portion is accessed by the garbage collector.

10. The method according to claim 9 further including the step of determining an age-out time of data, the age-out time used by the garbage collector when identifying aged-out data.

11. The method according to claim 9 further including the step of setting a computer processor clock to operate at a frequency that conserves battery power when the garbage collector executes.

12. A computer-implemented method for storing and retrieving information records in a computer system's memory organized as at least one linked list, at least some of the records stored in memory aging-out, the method comprising executing on a computer processor the steps of:
    determining an age-out time of records,
    searching a linked list for a non-aged-out target record with a matching key,
    identifying at least some of the aged-out records using the age-out time while searching for the target record,
    determining a maximum linked list length so as to enable an auxiliary parallel global background garbage collector, which executes asynchronously as a separate thread with respect to searching for a non-aged-out target record with a matching key, to select at least one linked list for identifying aged-out records,
    accessing at least some of the linked lists whose length is excessive in light of the maximum linked list length using the garbage collector,
    identifying aged-out records using the garbage collector when a linked list is accessed by the garbage collector.

13. The method according to claim 12 further including the step of inserting a record into a linked list if the non-aged-out target record is not found when searching.

14. The method according to claim 13 wherein the step of determining the age-out time uses a local condition of the computer memory.

15. The method according to claim 14 wherein the local condition for determining the age-out time is linked list length.

16. The method according to claim 13 wherein the step of determining the age-out time uses a global condition of the computer system.

17. The method according to claim 16 wherein the global condition for determining the age-out time is the amount of memory available to store new data.

18. The method according to claim 16 wherein the global condition for determining the age-out time is a system load.

19. The method according to claim 12 wherein determining a maximum linked list length includes computing a numerical value that varies monotonically nondecreasingly with the amount of memory available to store new data.

20. The method according to claim 19 wherein determining the age-out time uses a linked list length.

\* \* \* \* \*